United States Patent [19]
Allendorf et al.

[11] Patent Number: 5,151,721
[45] Date of Patent: Sep. 29, 1992

[54] COMPRESSION JOINT FOR EYEGLASSES

[75] Inventors: Stephan C. Allendorf, Hoboken, N.J.; Thomas M. Dair, Valley Cottage, N.Y.

[73] Assignee: Corning Incorporated, Corning, N.Y.

[21] Appl. No.: 670,613

[22] Filed: Mar. 20, 1991

Related U.S. Application Data

[63] Continuation-in-part of Ser. No. 523,369, May 15, 1990, abandoned.

[51] Int. Cl.⁵ .......................... G02C 5/14; G02C 5/22
[52] U.S. Cl. .................................. 351/121; 351/111; 351/153
[58] Field of Search ............... 351/111, 113, 114, 121, 351/141, 153; 16/228

[56] References Cited

U.S. PATENT DOCUMENTS 4,408,843 10/1983 Bononi ............................. 351/153

Primary Examiner—Rodney B. Bovernick
Attorney, Agent, or Firm—Milton M. Peterson; Clinton S. Janes, Jr.

[57] ABSTRACT

A compression joint for assembly at the junction of an eyeglass temple and the adjacent lens frame. The joint has a resiliently compressible portion that is placed under compression when a temple is in fully open position. This permits the temple to swing beyond a normal open position and to be biassed toward a partially open position, thereby providing snug fitting glasses regardless of head size and/or wear during use.

14 Claims, 3 Drawing Sheets

COMPRESSION JOINT FOR EYEGLASSES

This application is a Continuation-In-Part Application of Ser. No. 07/523,369 filed May 15, 1990 now abandoned.

FIELD OF INVENTION

The field is ophthalmic ware, more particularly, a compression joint for use with a hinge system.

BACKGROUND OF THE INVENTION

A major problem encountered with eyeglasses is obtaining and maintaining a good fit on the wearer. An initial comfortable fit may usually be obtained by carefully selecting a frame size and then manually manipulating the temples to a comfortable condition. Invariably, this fit is lost with wear, and further adjustment is required. Furthermore, an initial good fit usually requires glasses custom fitted by a professional. Thus, it is normally not available in sport glasses and sunglasses sold over the counter.

To counter this problem, flexible or resilient, hinge systems have been proposed. Typically, such systems are mechanical in nature, and involve application of pressure. Thus, they may involve a spring-biassed arrangement, and/or may employ a camming action. A thin metal blade may be flexed, or the spring may be compressed as a temple is moved. The action is designed to urge the temple away from a fully open position. This in turn, tends to gently force the temple against the wearer's head to insure a continuing good fit.

Systems heretofore proposed have generally involved complex mechanical arrangements. Such systems tend to wear with use. Further, they present assembly problems. Therefore, a different, and a less complex, approach to the problem is much desired.

PURPOSES OF THE INVENTION

A basic purpose is to provide a compression joint for an improved eyeglass system.

Another purpose is to provide a compression joint that may be an integral part of the eyeglass, or that may be separable.

Still another purpose is to provide a system that does not involve flexible or pressure-applying metal parts.

A further purpose is to enable eyeglass frames to provide shape, fit, a secure feel and comfort over a wide range of head sizes.

A still further purpose is to provide an eyeglass system in which a continuing comfortable fit is obtained throughout the lifetime of the product.

SUMMARY OF THE INVENTION

The invention resides in an eyeglass assembly embodying a lens frame and temples, and hinge systems connecting the lens frame to the temples, the temples being so hinged to the frames that the inner ends of the temples are spaced from the outer edges of the frame. A compression joint is carried by each temple, the compression joint being composed of a sleeve portion fitted over the inner end of a temple, and a resiliently compressible portion at one end of the sleeve, the resiliently compressible portion being of greater thickness than the wall of the sleeve, with the resiliently compressible portion occupying the space between the temple and the frame as the temple is opened so that the temple may swing beyond the normal stop-limiting position, but will be biassed toward a partially closed position, whereby one size eyeglass assembly fits a plurality of head sizes. Customarily, the normal open position contemplates the temples being perpendicular to, i.e. at right angles to, the frame. Accordingly, in the inventive eyeglass assembly, the temples can be swung to a position greater than at a right angle to the frame.

In one preferred embodiment, the resiliently compressible portion has a vertical chamfer at its outer edge. In another, the joint is composed of an elastomeric material. The joint may be integral with, or separable from, the eyeglass assembly. The joint may be perforated to permit access to a screw in the hinge, or may be continuous to cover the screw. In a preferred embodiment, the joint is a sleeve that fits over a section of the temple that is reduced in cross-section, has a smooth outer wall and a thicker end portion that bears against the lens frame.

PRIOR ART

U.S. Pat. No. 4,408,843 (Bonomi) discloses a hinge joint for children's eyeglasses having at least one hinge half covered with an impact-absorbing silicone sleeve. An end face on the silicone sleeve butts up against a lens frame extension in FIGS. 1-3 of the patent. It is described as "a stop-limiting surface for limiting the opening of the temple relative to the bow." Such structure distinctly differs in concept and structure from one in which the temples and frame are intentionally separated to provide space for a resiliently compressible member of substantial thickness to permit increased outward swing of the temple beyond the normal stop-limit which occurs when the temple contacts the lens frame.

The following United States Patents disclose prior systems for biassing eyeglass temples away from a fully open position, and are deemed of possible interest:

U.S. Pat. Nos. 3,654,376 and 3,762,805 (Lyons, Sr.) disclose a pressure means that includes a support body which fits snugly over a temple, and a flexible metal strip held by the support. The metal strip engages the end of the lens frame, and is placed in tension when the temple is fully open, thereby urging the temple to a closed position.

U.S. Pat. No. 4,534,628 (Morel) discloses a hinge system with an elastic return mechanism including a spring-loaded, slidable sleeve that abuts against the lens frame when the temple is extended beyond a partially open position.

U.S. Pat. No. 4,605,293 (Blumenthal) describes a resilient hinge arrangement with a rolling body that is mounted with a y-shaped flexion spring and bears against a cam that applies pressure to a temple.

U.S. Pat. No. 4,570,289 (Consolati) discloses a resilient hinge including a spring-biassed ball that bears against hard metal cap members arranged to provide a cam effect.

U.S. Pat. No. 4,494,834 (Tabacchi) discloses a spring-loaded hinge having the spring mounted in a slideable sleeve with a slot and guide member.

U.S. Pat. No. 4,689,851 (Beyer) discloses an elastic hinge with a spring in a slideable sleeve and a ball held in place by a screw that acts as a stop.

U.S. Pat. No. 4,448,502 (Tota) Describes a spreadable bar having a spring hinge fixed to the bar and a guide and hinge member on the lens frame. The latter is made of a synthetic material, as may also be a casing and the spring.

U.S. Pat. No. 4,886,349 (Willis) discloses a templeless frame that has wing portions with interior foam pads that bear on the wearer's head. The wings may be integral or may have a spring hinge in the nose bridge.

U.S. Pat. No. 4,780,928 (De Lorenzo Poz) describes a hinge made up of a hook part embedded in a lens frame, and a part connected to a temple. The two parts are connected by a pin, and the temple part has a thin wall that is flexed by a cam action exerted by the hook.

Each of these systems is considered to be based on a different principle of action, and a different material, than those characteristic of the present invention.

BRIEF DESCRIPTION OF THE DRAWING

In the accompanying drawings.

GENERAL DESCRIPTION OF THE INVENTION

The invention is concerned with compression joints that may be an integral part of a pair of eyeglasses, or may be separate members for use with a pair of eyeglasses. Each joint embodies a compressible (elastomeric) part positioned between the eyeglass frame front and the temple piece. The compressible part absorbs the "in use" forces transmitted through typical eyeglass frames, allowing the eyeglass frames to retain their shape, fit, secure feel and comfort over a wide range of head sizes.

The compression joint increases the comfort range of eyeglasses because the resilient, spring-like nature of the compressible material keeps the temple pieces in a snug position against the head. The compression joint will also counteract the tendency for the fit of eyeglasses to become loose on the face and head with everyday use, and thus provide a continuing comfortable fit during the lifetime of the product.

SPECIFIC DESCRIPTION OF THE INVENTION

The invention is further described with reference to specific preferred embodiments as illustrated in the accompanying drawing.

Figure 1:
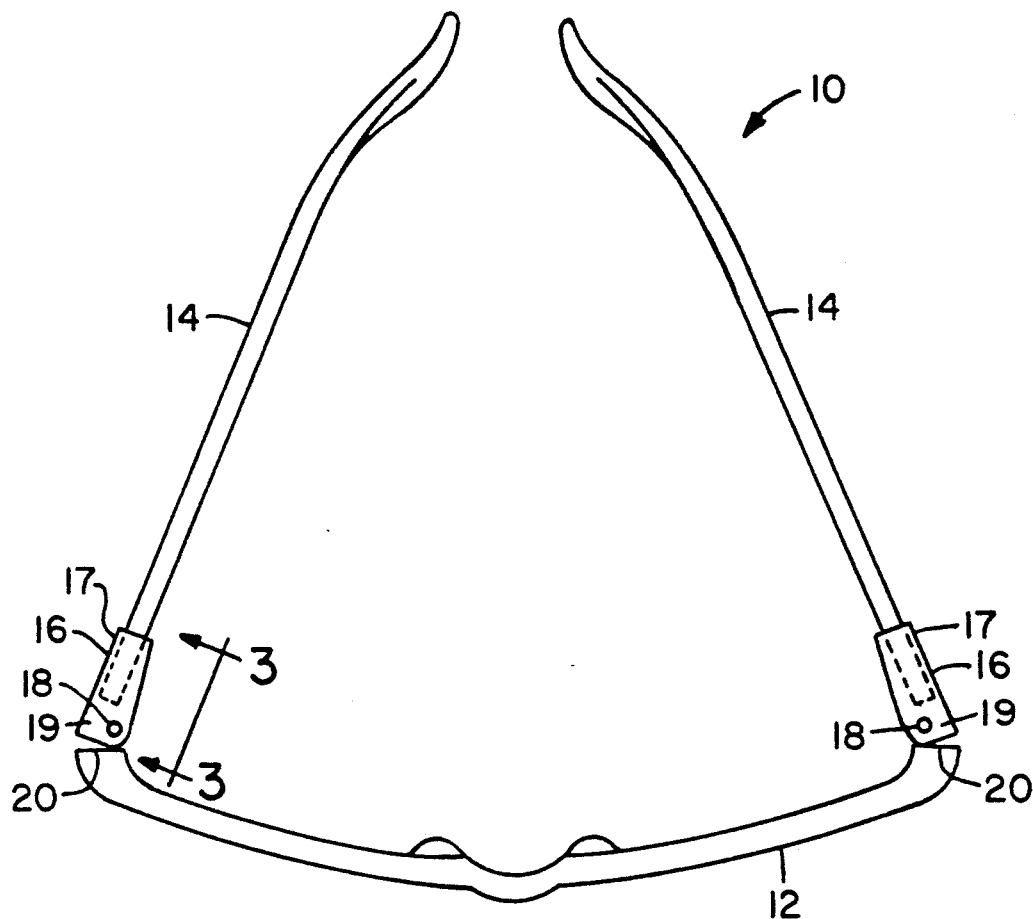
FIG. 1 is a top view of an eyeglass assembly in accordance with the invention.

FIG. 1 is a top view of a pair of eyeglasses 10, including a lens frame 12 and temples 14, the latter being in partially closed position. Lens frame 12 and each temple 14 are substantially separated from each other as indicated by dotted lines in FIG. 1 and more clearly shown in subsequent FIGURES. Compression joints 16 have sleeve portions 17 and resiliently compressible portions 19. Sleeves 17 are mounted on the inner ends of each temple 14, while compressible portions 19 occupy the spaces separating frame 12 and temples 14.

As shown, joint 16 is perforated to provide access to screw 18 in an internal hinge assembly (not visible). In an alternative construction, the perforation in joint 16 may be omitted. This prevents screw 18 from being lost if it works loose, but makes access more difficult.

It will be appreciated that joint 16 may be mounted on the lens frame 12, or may be carried by a hinge system, as well as on the temple. The latter is preferred.

Front surface 20 of compressible member 19 is separated from lens frame 12, when temple 14 is partially closed as shown. It abuts a corresponding end surface on lens frame 12 as temple 14 is swung toward an open position. Further, opening of temple 14 places joint 16 in compression. However, the separation of lens frame 12 from temples 14 eliminates the stop-limiting action that normally occurs when the frame and temples come in contact in an open position. The present structure permits temple 12 to be swung somewhat beyond the normal open position due to the combined effect of the spacing and the compressibility of portion 19. The compression in portion 19 biases the temple back to the partially closed position shown in FIG. 1.

Figure 2:
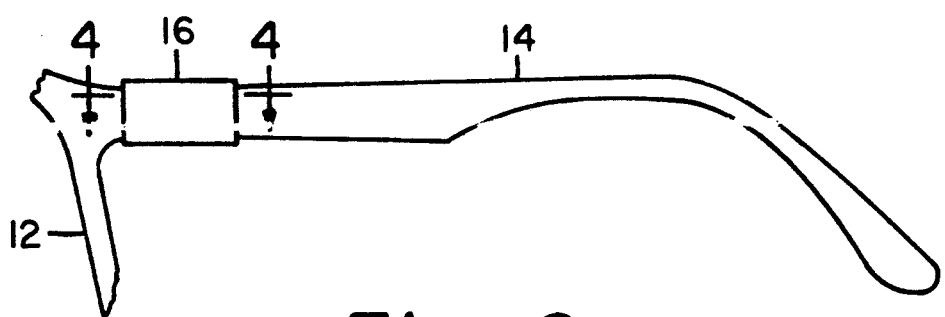
FIG. 2 is a side elevational view of the eyeglass assembly of FIG. 1.

FIG. 2 is a side elevational view of the assembly of FIG. 1. This shows the appearance of temple 14 and joint 16 in a combination where temple 14 has a relatively flat side and is generally rectangular in cross-section. It will be appreciated that temple 14, may, alternatively, be round, or may take any other configuration known in the art.

Figure 3:
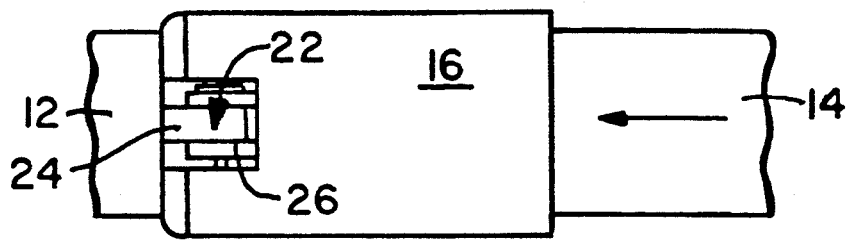
FIG. 3 is an inside view taken along line 3—3 on FIG. 1.

FIG. 3 is a view of a portion of the inside surface of temple 14. The view is taken along line 3—3 of FIG. 1. It shows a slot in joint 16 that reveals a standard hinge arrangement 22 between temple 14 and frame 12. As shown, hinge 22 includes a bar member 24 embedded in, and extending from, frame 12. Bar member 24 is pinned within yoke 26, extending from temple 14, to provide hinge 22.

Figure 4:
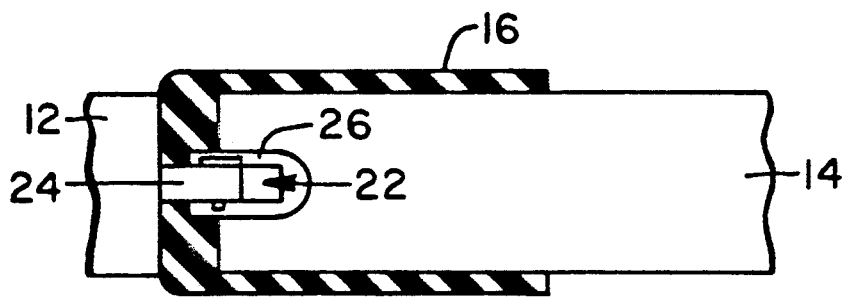
FIG. 4 is a view in cross-section along line 4—4 of FIG. 2.

FIG. 4 is a view in cross-section taken along line 4—4 of FIG. 2. This shows the relationship of hinge 22 to joint 16.

Figure 5:
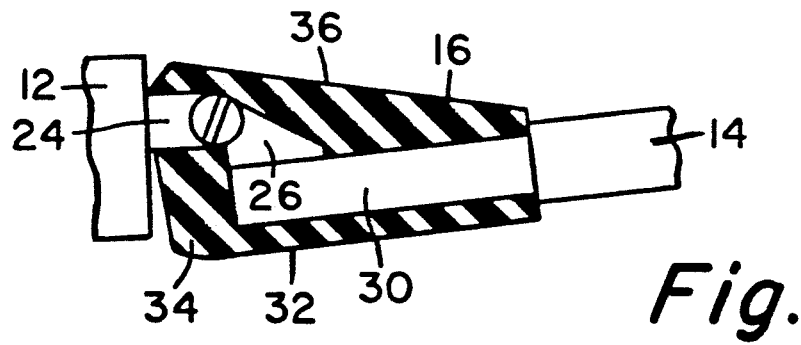
FIG. 5 is a top view in cross-section showing a temple in fully open position.
Figure 6:
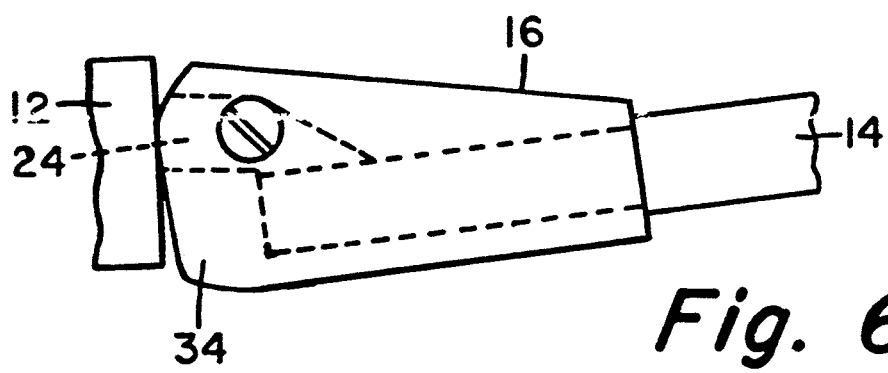
FIG. 6 is a top view similar to FIG. 5, but not in cross-section.

FIGS. 5 and 6 are top views, FIG. 5 being in cross-section. These FIGURES each show temple 14 in an open position wherein joint 16 abuts frame 12, and is placed in compression. The FIGURES show the sleeve-like construction of joint 16. They also show the manner in which joint 16 may be positioned, and held in place, on an inner end of temple 14 having a reduced cross-section. Due to its elastomeric nature, joint 16 fits snugly over end 30 of temple 14.

As shown, joint 16 may be considered as having an outer wall 32 of substantially uniform thickness and essentially parallel with temple 14. Outer wall 32 merges into a thick end portion 34 which is the active element, and which occupies the substantial space separating temple 14 from frame 12. Inner wall 36 of joint 16 is beveled progressively inwardly as it extends toward frame 12.

FIGS. 5 and 6 show temple 14 in a normally fully open position. In this position, inner end portion 34 of joint 16 is placed in compression, such compression being further increased if temple 14 is swung beyond such normally open position. The tendency is to release such compression by urging temple 14 back to a partially open position as illustrated in FIG. 1. Thus, temple 14 is gently pressed against a wearer's head to provide a comfortable fit. The material of joint 16, and more particularly of compressible end portion 34, will be chosen to provide a degree of compression such as to avoid undue pressure on the wearer.

Figure 7:
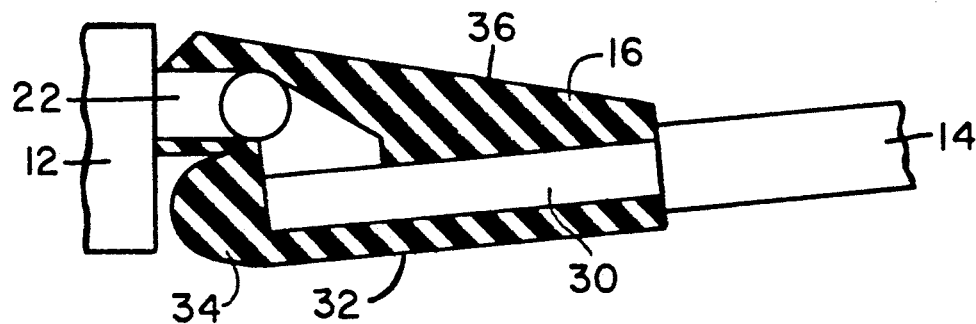
FIGS. 7, 8 and 9 are top views in cross-section, similar to FIG. 5, but showing alternative configurations for the joint member of the invention.
Figure 8:
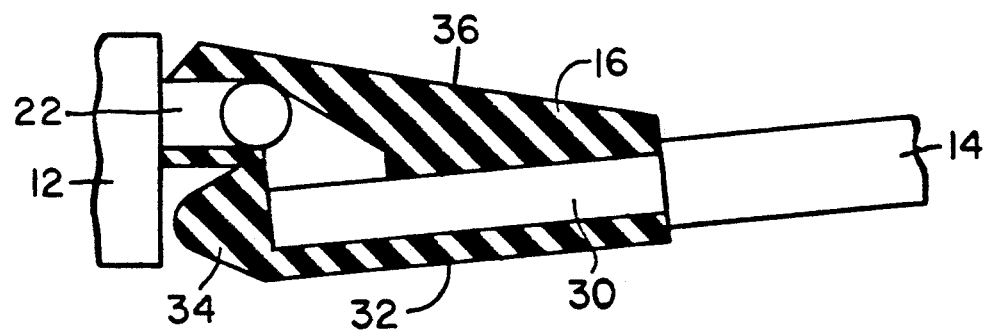

It will be appreciated that joint 16, and particularly end portion 34, are not limited to the particular shape shown. Rather, end 34 might take any desired configuration that provides the desired degree of compression. Thus it might be conical, as shown in FIG. 7, or triangular as shown in FIG. 8. Also, various notched or indented designs are contemplated, depending in large part on appearance considerations.

Figure 9:
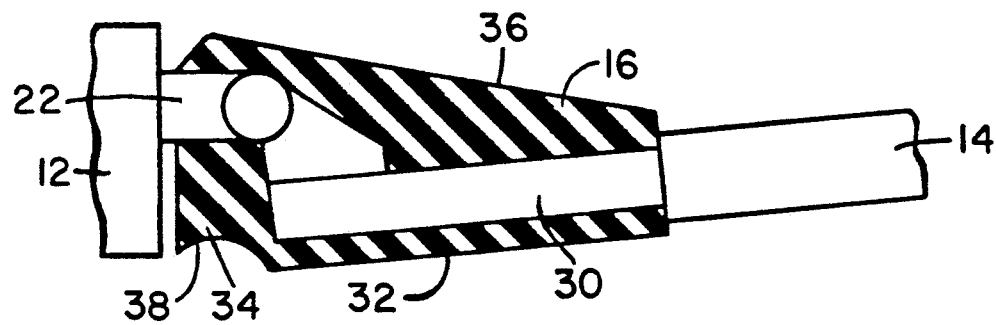
Figure 10:
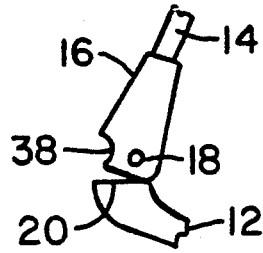
FIG. 10 is a fragmented view corresponding to FIG. 1, but embodying the preferred configuration of FIG. 9.

FIGS. 9 and 10 illustrate a preferred embodiment of the invention. FIG. 9 is a top view in cross-section showing a variation of FIG. 5. In this variation, temple 14 is spaced from frame 12 as in prior embodiments. Also, compressible portion 34 occupies the separation space. It differs in that a vertical chamfer 38, shown as generally cylindrical in nature, is formed along the outer side edge of portion 34. This relieves the compressibility in portion 34 to a degree, thus relieving somewhat the pressure created when temple 14 is swung beyond its normal open, or stop-limiting, position.

FIG. 10 is a fragmented top view showing one of the hinged assemblies of FIG. 1 equipped with the compression joint of FIG. 9. As in FIG. 1, the temple 14 is in a partially closed position.

We claim:

1. In an eyeglass assembly embodying a lens frame and temples, and hinge systems connecting the lens frame to the temples, the temples being so hinged to the frames that the inner ends of the temples are spaced from the outer edges of the frame, a compression joint carried by each temple, the compression joint being composed of a sleeve portion fitted over the inner end of a temple, and a resiliently compressible portion at one end of the sleeve, the resiliently compressible portion being of greater thickness than the wall of the sleeve and having a vertical chamfer at its outer edge, the resiliently compressible portion occupying the space between the frame and the temple as the temple is opened so that the temple may swing beyond the normal stop-limiting position and will be biased toward a partially closed position, whereby one size eyeglass assembly fits a plurality of head sizes.

2. An assembly in accordance with claim 1 wherein the joint is integral with the eyeglass assembly.

3. An assembly in accordance with claim 1 wherein the joint is separable from the eyeglass assembly.

4. An assembly in accordance with claim 1 wherein the joint is perforated to permit access to a screw member of the hinge system.

5. An assembly in accordance with claim 1 wherein the portion of the temple covered by the sleeve is of reduced cross-section relative to the remainder of the temple.

6. An assembly in accordance with claim 1 wherein the joint has a slot that exposes the hinge system.

7. An assembly in accordance with claim 1 wherein the joint has an outer wall of substantially uniform thickness that is essentially parallel with the temple surface, and that merges into a thickened end portion between the lens frame and the temple.

8. An assembly in accordance with claim 7 wherein the joint has an inner wall that is beveled progressively inward toward the lens frame and that encompasses the hinge system.

9. An assembly joint in accordance with claim 1 wherein the joint is composed of an elastomeric material.

10. A compression joint for use in conjunction with an eyeglass assembly so that the temple may swing beyond a normal stop-limiting position and will be biased toward a partially closed position, the compression joint being composed of a sleeve portion fitted over the inner end of a temple, and a resiliently compressible portion at one end of the sleeve, the resiliently compressible portion being of greater thickness than the wall of the sleeve and having a vertical chamfer at its outer edge, the resiliently compressible portion occupying the space between the frame and the temple as the temple is opened whereby one size eyeglass assembly fits a plurality of head sizes.

11. A joint in accordance with claim 10 having a perforation that permits access to a screw member in a hinge assembly for an eyeglass assembly.

12. A joint in accordance with claim 10 having an outer wall of substantially uniform thickness that merges into a thickened end portion to be positioned between the lens frame and the temple of an eyeglass assembly.

13. A joint in accordance with claim 12 having a beveled inner wall.

14. A joint in accordance with claim 10 that is composed of an elastomeric material.

* * * * *